UNITED STATES PATENT OFFICE.

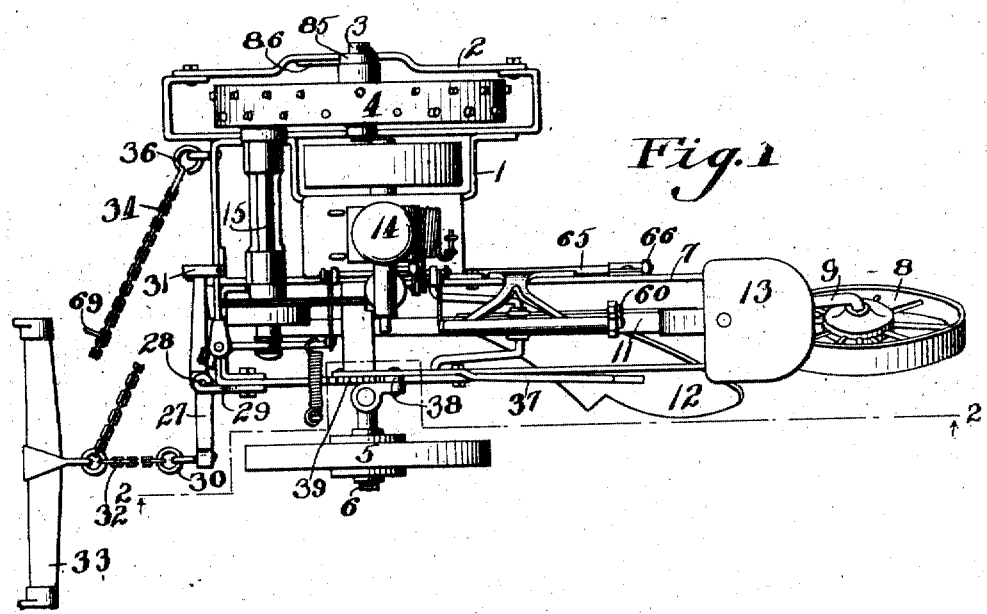

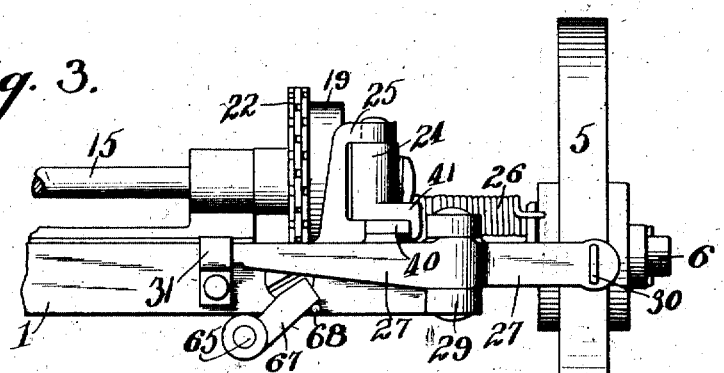
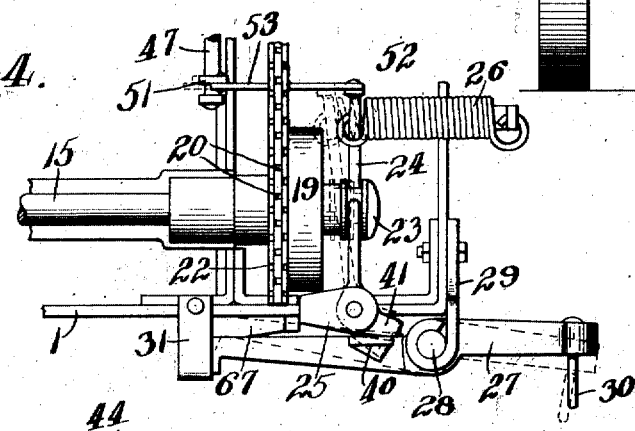
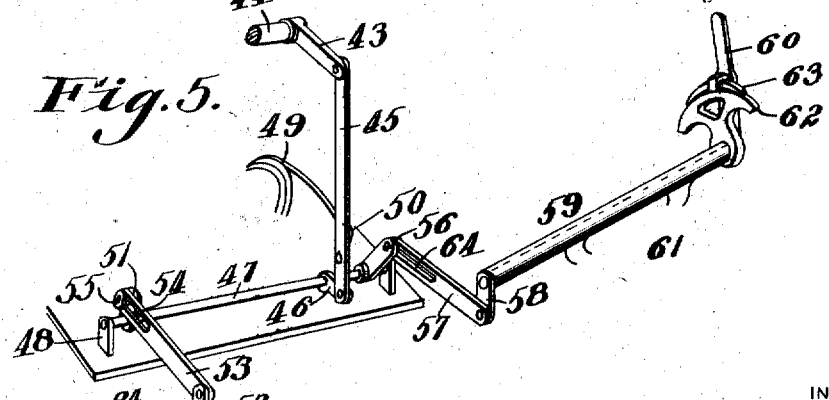

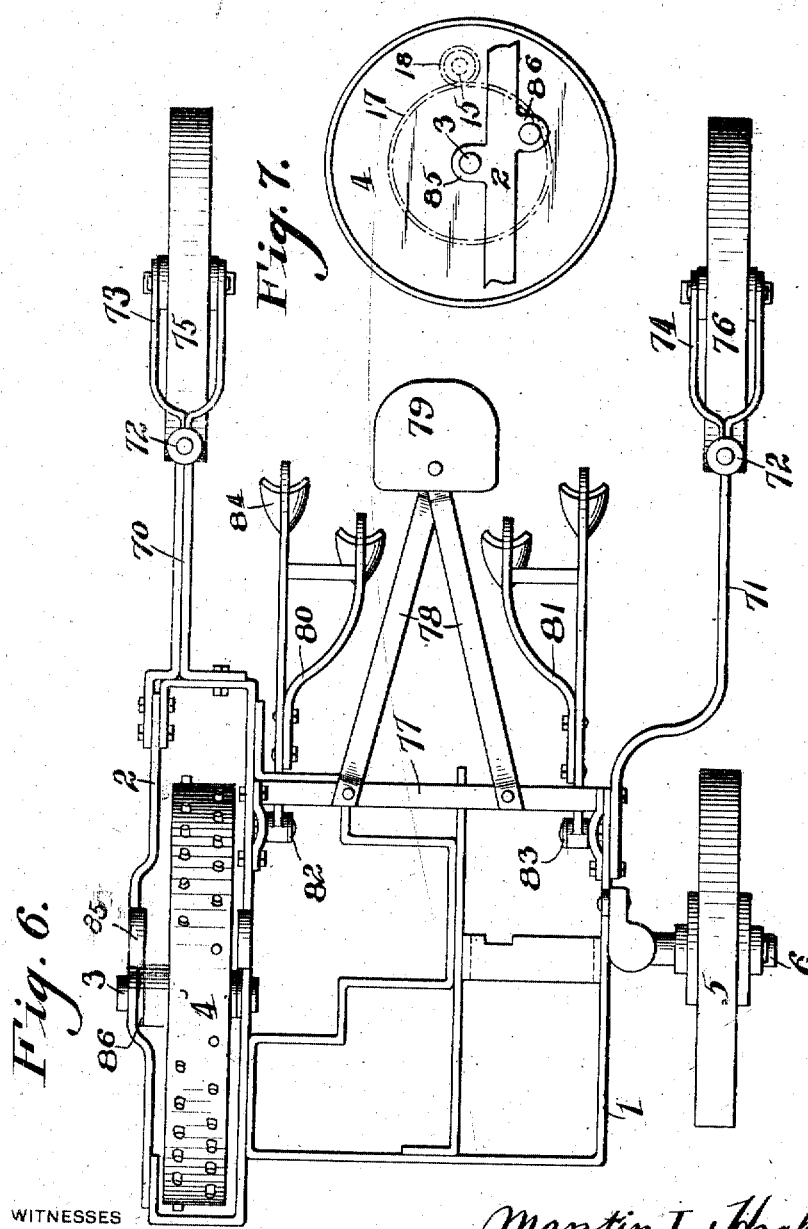

MARTIN L. HACKLEMAN, OF MORRISTOWN, INDIANA.

AGRICULTURAL IMPLEMENT.

1,252,432.   Specification of Letters Patent.   Patented Jan. 8, 1918.

Application filed May 26, 1916. Serial No. 100,139.

*To all whom it may concern:*

Be it known that I, MARTIN L. HACKLEMAN, a citizen of the United States, residing at Morristown, in the county of Shelby and State of Indiana, have invented certain new and useful Improvements in Agricultural Implements, of which the following is a specification.

My invention relates to improvements in agricultural implements, and more particularly to draft and propelling means by which the implements are moved across a field.

An object of my invention is to provide a plow, cutivator, or other agricultural implement adapted to be operated by combined animal power and mechanical power, such as an internal combustion engine, electric motor, or other suitable power means.

A further object is to so construct the machine that it may be used primarily as a plow, and may then be converted by substituting interfitting parts to adjust the machine as a cultivator, without in any way changing or altering the application of the propelling power.

Another object is to arrange the parts in such a manner that as the horse or other draft animal starts forward the power of the engine is automatically thrown on to couple the tractive force from the engine with the draft pull of the animal.

A still further object is to provide connections so arranged that as the engine is coupled in the driving relation the throttle is thrown wide open and may then be actuated by the operator to control the engine.

Yet another object is to form the control means for the throttle in such a manner that the steering of the implement may be accomplished by increasing or decreasing the tractive force exerted by the engine in proportion to the draft pull of the animal, and to so arrange the parts that the instant that the pulling exerted by the animal stops, the engine power is automatically shifted off and the power operated traction means is inoperative; also, the carbureter is throttled automatically for the engine to run idle until the draft animal starts to pull again.

With the above and other objects in view, my invention consists in certain novel features of construction and combinations of parts which will be hereinafter set forth in connection with the drawings and then more particularly pointed out in the claims.

In the drawings:—

Figure 1, is a top plan view of a machine or implement constructed after the manner of my invention.

Fig. 2, is a view in side elevation and partly in section on the line 2—2 of Fig. 1.

Fig. 3, is a fragmentary front elevation of one side of the machine.

Fig. 4, is a top plan view of the structure shown in Fig. 3.

Fig. 5, is a perspective view of those portions of the structure used in the control of the engine throttle.

Fig. 6, is a plan view showing a slightly modified form of the structure.

Fig. 7, is a fragmentary view in elevation from the traction side of the machine.

One of the greatest difficulties in the path of a small farmer, is that where draft animals are used in plowing, cultivating, or otherwise tilling the soil, acres must be devoted to raising feed for such animals, thus considerably cutting down the producing tillable acreage, and yet horses or other draft animals cannot be dispensed with entirely, and it is one of the prime objects of my invention to provide an agricultural implement which may be used with a single draft animal and with power arranged to coöperate with the draft animal, whereby the work usually requiring two or more horses or other draft animals, can be accomplished with a single animal without undue strain; also, it is a purpose to arrange portions of the machine to be interchangeable so that portions of a plowing machine, for instance may be removed and the proper portions of a cultivating mechanism substituted therefor without in any way altering the efficiency of the operation of the essential parts of the implement, giving a maximum of utility at a minimum cost for the original machinery, and permitting the use of the machine throughout approximately the whole period of the preparation of the soil and early or entire cultivation of the crop.

The main frame 1 has a yoke shaped frame structure 2 which is provided with bearings to receive a stub shaft 3, on which a traction wheel 4 is mounted to be capable of turning movement. A carrying wheel 5 is mounted on the stub axle 6, which is preferably adjustably connected with the frame 1 in the manner usually adapted for such connection, so that the relative height at which the two sides of the frame are carried can be adjusted.

An auxiliary frame 7 is connected to extend rearwardly from the main supporting frame 1 and is supported by a trailing wheel 8 mounted on the bracket arm 9, which arm is in turn pivotally mounted in a suitable bearing 10 on the auxiliary frame 7 so that this trailing wheel 8 may have free swinging movement to either side as the implement frame is turned. A plow beam 11 is mounted in any approved manner in conjunction with the frame 1 and the auxiliary frame 7, and a plow 12 is carried by the beam 11 it being preferable that the beam be so mounted on the frame structures 1 and 7 that it may be raised and lowered in the usual manner to permit adjustment of the depth of the furrow which is cut by the plow. A seat 13 is mounted on the auxiliary frame 7 at such a point that the operator is back of the main frame structure 1 when riding in this seat.

A power unit which in the present instance is shown as the internal combustion engine 14 is mounted on the frame structure 1, its shaft extending preferably in a line parallel with the extent of the stub shafts or axles 3 and 6, and a transmission shaft 15 is mounted on the frame structure 1 forwardly of the engine structure 14, to lie parallel with the engine shaft 16, the rim of the traction wheel 4 is preferably connected to the hub thereof by a solid web, and a gear wheel 17 is mounted in the hub to be inclosed by the rim and the web of the traction wheel 4, a gear wheel 18 being mounted on the end of the transmission shaft 15 to mesh with this gear wheel 17. A clutch drum 19 is mounted on the inner end of the shaft 15 to be capable of turning movement thereon and is provided with sprocket teeth as shown at 20. A sprocket wheel 21 is mounted on the engine shaft 16, and a sprocket chain 22 is connected around the sprocket teeth 20 of the drum 19 and around the sprocket wheel 21, so that as the engine operates motion will be transmitted to turn the drum 19 at a reduced speed of revolution over the engine shaft.

As the clutch drum 19 is loosely mounted on the shaft 15, motion will not ordinarily be transmitted to this shaft to turn the traction wheel 4, a clutch mechanism being however provided on the hub 23 which is splined or otherwise held on the shaft 15 against turning movement but yet to be capable of sufficient sliding movement to accomplish a proper connection with the clutch drum 19 so that the drum will be locked on the shaft 15 to impart turning movement thereto from the engine shaft and in consequence to cause the pinion 18 to turn the gear wheel 17 which is carried on the hub of the traction wheel 4. A clutch shifting lever 24 is pivotally mounted in a suitable bearing 25 carried by the frame 1 and is arranged in conjunction with the hub 23 in such a manner that upon swinging of this lever 24 in opposite directions the hub will be brought into and out of operative relation to lock the clutch drum 19 to revolve with the shaft 15. A suitable spring 26 is connected between the free end of the operating lever 24 and a fixed portion of the frame 1 in such relation that the operating lever is normally held to a position to bring the clutch hub 23 to the inoperative relation, and in this way there will not normally be rotation of the shaft 15 during operation of the engine 14.

With the structure as hereinbefore described, even though the clutch hub may be moved to couple the shaft 15, to rotate with the engine shaft 16, tractive power will be applied to one side only of the machine and due to the fact that the trailer wheel 8 is loosely mounted on the frame, the machine will be caused to have movement in a substantially circular path, and to apply the proper propelling power to the remaining side of the machine, the draft animal is to be hitched to the frame 1 on the far side from the mounting of the traction wheel 4. A link 27 which is in substantially the form of a double tree is pivoted at its approximate center at 28 on the bearing member 29 which is secured on the side of the frame 1 away from the mounting of the supporting structure 2 for the traction wheel, and a staple and ring 30 are connected with the outer end of this connecting link 27, a suitable yoke 31 being provided to fit over the inner end of the link 27 to hold the same against up and down swinging movement and to also maintain the proper positioning of this link member so that it will swing forwardly and backwardly in a predetermined path of movement. A hitch chain 32 is connected with the staple or hook 30 and is extended forwardly to have a swingle tree 33 connected with the free ends thereof, a second hitch chain 34 being extended obliquely from the connection with the swingle tree 33 and connected with the frame 1 adjacent to the mounting of the traction wheel 4 so that the proper drawing tension upon the hitch will be accomplished. The traction wheel 4 has spurs or other suitable roughing means on the tread surface thereof, and thus this wheel will be held against slipping, and as the bearing wheel 5 is positioned substantially to travel in the furrow and the trailing wheel 8 will be in the furrow just opened by the plow share 12, the machine will travel in a proper relation during operation, however, to accomplish the proper hitching of the draft animal it is perhaps preferable that a hook 36 be interposed in the connection from the swingle tree 33 through the draft chain 34 to the frame so that the length of this chain 34 may be varied to change the position at which the swingle tree 33 is held in advance of the machine. To accommodate the unevenness in the surface levels where the carrying wheel 5 and the traction wheel 4 are traveling, this carrying wheel 5 has the stub axle 6 thereof adjustably mounted on the frame as hereinbefore set forth and a hand lever 37 is connected in any approved manner as by means of the links 38 to vary the adjustment of the height or disposition of the wheel 5, a rack 39 being provided to maintain the setting when once the same has been accomplished.

It is my intention that the power connection to the traction wheel 4 shall be established immediately the draft animal exerts a pull upon the hitch chain 32 so that the animal and the mechanical propelling means will act as a unit, and that the power will be cut off the instant the draft animal stops and consequently releases the pull exerted on the chain 32. As has been stated, the connecting link 27 is mounted to be capable of swinging movement and the inner end thereof is free of any connection, and this free end of the link 27 has a lug 40 projecting upwardly therefrom to engage with an arm 41 which is formed on the operating lever 24 adjacent to the point of mounting thereof in the bearing 25. As the link 27 is swung to then bring the lug 40 into bearing engagement with the arm 41, this link will assume the relation shown in dotted lines in Fig. 4 and at the same time the clutch lever 24 will be swung to the position indicated in the dotted lines where it will cause inward movement of the hub 23 and in consequence will cause the clutch drum 19 to be coupled with the shaft 15. In this way, as the draft is applied to the hitch chain 32, the connecting link 27 will be instantly swung around its pivotal mounting at 28 and the operating lever 24 will in turn be moved to cause the driving connection to be established to the shaft 15 and in consequence the traction wheel 4 will be turned.

When the hub 23 is in the inoperative relation, the engine 14 is running entirely free from any load and it is therefore desirable to provide some means of arrangement which will prevent racing of the engine at such times and which will cause acceleration of the same and the accomplishment of the greatest driving power at the instant when the engine is coupled in to drive the traction wheel 4. The carbureter 42 of the engine has an arm 43 mounted on the throttle stem 44, and a link 45 establishes connection between this arm 43 and an arm 46 which is mounted to turn with the shaft 47 journaled in suitable bearings 48 carried by the frame or by the engine base structure and thus as the shaft 47 is turned, movement will be transmitted to the throttle of the carbureter 42 through the connection to the stem 44 thereof. A suitable spring 49 is connected on the engine structure and at its free end has connection with a link 50 by which it is secured to the link 45, and thus as the shaft 47 is let free, this spring 49 will act to raise the link 45 and in consequence the stem 44 will be turned to entirely open the carbureter throttle. An operating arm 51 is secured on the shaft 47 to extend substantially at right angles to the arm 46 and an upstanding arm 52 has a link 53 suitably connected thereon to extend to have its free end adjacent to the operating arm 51. The free end of the link 53 has a slotted opening 54 therein and a pin 55 is mounted through the slotted opening and in the free end of the operating arm 51 so that as the operating lever 24 is normally moved over under the tension of the spring 26, drawing tension will be exerted through the link 53 and against the operating arm 51 to turn the shaft 47 by depressing or drawing down the link 45 against the tension of the spring 49 and closing the throttle of the engine. It is not the intention that the drawing tension exerted by the spring 26 shall turn the shaft 47 sufficiently to entirely close the throttle of the engine, but only that this closing of the throttle shall be sufficient that the engine will not race when the operating lever 24 is moved over to the position shown in full lines in Fig. 4 where the drum 19 is free to rotate on the shaft 15 and in consequence the engine is not under load, and while the swinging of this operating lever 24 to connect the clutch drum 19 to drive the shaft 15 through the drawing tension on the hitch chain 32 will cause the engine throttle to be opened wide, it is preferable that some means be provided to govern the engine through the carbureter throttle, and to this end a control operating arm 56 is secured on the shaft 47 and has connection through a link 57 with a crank arm 58 on a control shaft 59 which has the throttle lever 60 mounted on the inner end thereof. This shaft 59 is extended through a suitable housing 61 which is mounted on the frame work of the machine and is brought rearwardly to a position that the throttle lever 60 is disposed at a point within ready grasp of the operator when occupying the seat 13. A segmental block 62 is carried by the bearing sleeve 61 and suitable friction brake means 63 is provided on the throttle lever 60 so that as the throttle lever is set these settings will be maintained until the lever is again manually moved. It is not the intention that the throttle lever 60 shall be used to control the engine when working without a load, and thus it is preferable that the link 57 have a slotted opening 64 at its point of connection with the arm 56, this allowing forward swinging movement of the arm 56 as the shaft 47 is moved under the action of the spring 26, and the spring 49 acting in conjunction with the link 45 to normally move the parts to open the throttle subsequent to partial closing of the same by the movement of the link 57.

During the pulling by the draft animal, the link 53 will be at all times moved to a relation to permit a full supply of explosive charge through the engine throttle unless some means is provided to hold the link 57 against turning movement, as when the machine is being taken to and from the field, this same action would be accomplished, and to overcome this objectionable feature a shaft 65 is connected to the frame work with an operating handle 66 connected therewith at a point adjacent to the operator's seat so that upon movement of this handle 66, the shaft will be turned, a stop block 67 is mounted on the forward end of the shaft 65 and to work adjacent to the link 27, a pin 68 being provided to normally support this stop block in the relation shown in Fig. 3 where it is below the link 27. As the handle 66 is operated to turn the shaft 65, the stop block 67 will be brought to a position of engagement between the forward frame member and the link 27 and in consequence this link will be locked against swinging movement around its pivotal mounting at 28 and tension cannot be exerted against the arm 41 to cause coupling of the drum 19 with the shaft 15 and to also cause opening of the throttle. To permit this drawing of the machine to and from the field it is preferable that a hitch ring 69 be connected in the chain 34 in a relation that the swingle tree 33 may be connected therewith and draft will be applied at approximately the drawing center of the machine when the draft animal is hitched to this swingle tree.

While the carrying wheel 5 and the trail wheel 8 will travel in the furrows as hereinbefore set forth, it is preferable that some means be provided to steer the course of travel of the machine in traveling across the field and also in turning at the ends of the furrows or in turning corners, and this may be accomplished through the carburetor throttle by either accelerating or cutting down the mixture to cause variations in the speed of operation and consequently the power of the engine. As there may be variations in the speed of rotation of the shaft 15, the traction wheel 4 will be caused to travel at a greater or lesser number of revolutions for the distance traveled by the machine, and by reason of the fact that the speed of propulsion on the side of the machine to which the draft animal is hitched is substantially constant, the machine will be caused to turn to one side or the other as the speed of rotation of the traction wheel may be increased or decreased. This control of the traction wheel can be accomplished through manipulation of the throttle lever 60 as has been hereinbefore set forth to close or partly close the carbureter throttle, the spring 49 acting to normally hold the throttle in the full open relation when the shaft 15 is coupled in the driving connection, or some other form of connection may be made to accomplish this same purpose.

With the form of the device as shown in Fig. 6, the main portions of the frame structure 1 are identical with several portions as shown in the remaining illustrations of the drawings, and in this view the parts are shown in the relation which would be occupied when the device is to be used as a cultivator; by having the plow structure thereof removed and a cultivator structure introduced in lieu thereof to convert the machine. In this adaptation of the invention, the frame structure 7 is removed and the separate frame portions 70 and 71 are attached at opposite sides of the frame structure 1 so that they will have the bearings 72 thereof substantially in line with the centers of the shafts of the carrying wheel 5 and the traction wheel 4. Suitable bracket members 73 and 74 have the trailing wheels 75 and 76 carried thereby and these bracket members are mounted in the bearings 72 so that the trailing wheels will travel substantially in the rear of and in line with the traction wheel 4 and the carrying wheel 5. By constructing the parts as above set forth, a structure is provided which takes the place of the frame 7 and the trail wheel 8 and with which the machine is given a four-point support.

A cross bar 77 is secured between the side members of the frame structure 1 and the seat supporting members 78 are connected at their inner ends on this cross bar 77 and have the seat 79 mounted on their connected outer ends. The cultivator frames 80 and 81 are mounted by suitable bearings 82 and 83 on the frame 1 so that they will be capable of swinging movement to the raised and lowered relations to bring the shovels 84 into and out of the operative relation, and any suitable form of means may be provided to raise and lower these frames 80 and 81, this means being of common form and for this reason not being here shown.

Where the structure is to be used in mounting and carrying a plow, it would not be material as to what height the frame structure is carried above the ground, but where the machine is used as a cultivator, when the plant has grown to any height, it would be necessary to have the frame structure carried at a considerable distance above the ground, so that the full height of the plant being cultivated will be accommodated and breaking the same will not occur. As it is advisable that the plow be supported as low down as is possible, it is preferable that the portion of the frame structure 2 for the mounting of the traction wheel 4 be provided with bearings to accomplish the adjustment of the height at which the frame is carried. As is shown in Fig. 7, the bearings 85 are formed above the side portions forming the frame structure 2 and the bearings 86 are formed below these side members so that as the stub shaft 3 is shifted from the bearings 85 to the bearings 86, the height at which the frame structure is carried above the surface of the ground will be increased. The one essential feature in the formation of these bearings is that they shall be so positioned that as the mounting of the traction wheel 4 is changed, the gear wheel 17 will be brought into mesh with the pinion 18, this being accomplished by keeping the center of the bearings 85 and 86 at the same radial distance from the mounting of the shaft 15.

From the foregoing it will be seen that I have provided an agricultural implement which is adapted to be operated by combined animal and mechanical power, the two powers acting together as a unit to be applied and cut off substantially simultaneously, that the steering of the course of travel of the implement is accomplished by manipulation of the power control, and that part of the structure may be removed and then other parts may be fitted in place thereof to convert the implement from a plow to a cultivator, etc. While I have herein shown and described only one specific form of the structure, it will be understood that variations might be resorted to in the form and arrangement of the several parts, that the machine might be constructed to be used as other implements than plow and cultivator, and that still other changes might be made without departing from the spirit and scope of my invention, and hence I do not wish to be limited to the exact disclosure but only to such points as may be set forth in the claims.

I claim:

1. With a machine mounted to be capable of traveling movement, means by which animal draft and mechanical power are applied as a unit to propel the machine, the mechanical power being applied at one side of the machine and the draft hitch for the animal being at the opposite side.

2. With a machine mounted to be capable of traveling movement, means by which animal draft and mechanical power are applied as a unit to propel the machine, the mechanical power being applied at one side of the machine and the draft hitch for the animal being at the opposite side, and a control connection arranged from the draft hitch to initiate the application of mechanical power upon pulling by the draft animal and to release the same upon slacking of the pull by the animal to thus maintain proper travel of the machine.

3. With a machine mounted to be capable of traveling movement, means by which animal draft and mechanical power are applied as a unit to propel the machine, the mechanical power being applied at one side of the machine and the draft hitch for the animal being at the opposite side, and manually controlled means to regulate and vary the propelling force applied by the mechanical power to thus cause the course of travel of the machine to be steered.

4. With a machine mounted to be capable of traveling movement, means by which animal draft and mechanical power are applied as a unit to propel the machine, the mechanical power being applied at one side of the machine and the draft hitch for the animal being at the opposite side, a control for the means generating the mechanical power and which control is actuated by the force exerted on the draft hitch by the draft animal, and manually operable means to vary the force exerted by the power means and consequently steer the course of travel of the machine.

5. With a machine having wheels mounted at opposite sides thereof, power means connected to transmit propelling movement to the wheel at one side of the machine, a draft hitch for a draft animal at the opposite side of the machine, and control means connected between said draft hitch and said power means in such arrangement that as the draft animal pulls the power means will be coupled to cause propelling force to be exerted upon the wheel connected therewith and as pull of the draft animal is slackened the power means is released from the driving connection.

6. A machine comprising a frame, wheels at opposite sides of said frame on which the same is mounted to be capable of traveling movement, power means carried by said frame, a train of transmission mechanism from said power means to that wheel mounted at one side of the frame, clutch means in said transmission mechanism arranged to be normally inoperative, means at the opposite side of the frame by which a draft animal may be hitched to the machine, and means arranged between the hitching means and the clutch in such relation that as draft is applied to the hitching means the clutch is thrown to connect the power means to drive the wheel associated therewith to coöperate with the draft animal in moving the machine.

7. A machine comprising a frame, a power wheel at one side of said frame, a carrying wheel at the opposite side of the frame, power means mounted on the frame and connected with the power wheel, a draft hitch at that side of the frame at which the carrying wheel is mounted, a control connection for the power means, and means associated with said control and the draft hitch in such a way that pulling by the draft animal automatically initiates the application of mechanical power to the power wheel.

8. A machine constructed to be capable of traveling movement, means by which animal draft and mechanical power are applied as a unit to propel the machine, a control connection arranged to initiate the application of mechanical power upon pulling by the draft animal and to release the same upon slacking of the pull by the animal, means connected with said control to bring the mechanical power means up to its highest efficiency and propelling power as the mechanical power means is thrown into the operative relation and to cut down the power as the draft pull by the animal is slackened, and manually controlled means to regulate the operation of the mechanical power means to vary the driving force exerted thereby in conjunction with the pull of the draft animal.

9. A machine comprising a frame, wheels by which said frame is mounted to be capable of traveling movement, mechanical power means arranged to apply power to the wheel at one side of said machine, draft means connected at the opposite side of the machine to permit hitching of a draft animal, a control for said power generating means, and manually operable means for actuating said control to vary the force exerted by the power means in proportion to the draft pull of the animal and consequently to steer the course of travel of the machine.

10. A machine comprising a frame, wheels by which said frame is mounted to be capable of traveling movement, mechanical power means mounted on said frame to impart propelling movement to the wheel at one side of the frame, means by which a draft animal may be hitched to the opposite side of the machine, means by which the mechanical power means is coupled in a driving relation upon initiation of pull by the draft animal, and manually operable means for controlling said power means to vary the force exerted thereby in proportion to the draft force exerted by the animal to steer the course of travel of the machine.

11. A machine comprising a frame, wheels upon which this frame is mounted to be capable of traveling movement, power means carried by the frame, a connection from said power means to one of said wheels, a clutch mounted in the connection to the wheel to be normally inoperative, draft means by which the draft animal may be hitched to the frame, a connection from the hitch of said draft means to the clutch so arranged that as a draft animal connected with the hitch starts forward the clutch is adjusted to establish a transmitting connection between the power means and the wheel, and means connected from said power means to the clutch control means to cause acceleration of the action of the power means as the clutch is shifted to the coupling relation.

12. A machine comprising a frame, wheels upon which this frame is mounted to be capable of traveling movement, power means carried by the frame, a connection from said power means to one of said wheels, a clutch mounted in the connection to the wheel to be normally inoperative, draft means by which the draft animal may be hitched to the frame, a connection from the hitch of said draft means to the clutch so arranged that as a draft animal connected with the hitch starts forward the clutch is adjusted to establish a transmitting connection between the power means and the wheel, means connected from said power means to the clutch control means to cause acceleration of the action of the power means as the clutch is shifted to the coupling relation, and manually operable means to control the mechanical power generating means to vary the driving force transmitted therefrom to the power means.

13. A machine comprising a frame, wheels upon which this frame is mounted to be capable of traveling movement, power means carried by the frame, a connection from said power means to one of said wheels, a clutch mounted in the connection to the wheel to be normally inoperative, draft means by which a draft animal may be hitched to the frame, a connection from the hitch of said draft means to the clutch so arranged that as a draft animal connected with the hitch starts forward the clutch is adjusted to establish a transmitting connection between the power means and the wheel, means connected from said power means to the clutch control means to cause acceleration of the action of the power means as the clutch is shifted to the coupling relation, manually operable means to control the mechanical power generating means to vary the driving force transmitted therefrom to the power means, and means to cause acceleration of the power means as the clutch is thrown in and to throttle said means as the clutch is released.

14. A machine comprising a frame, wheels by which said frame is mounted to be capable of traveling movement, mechanical power means arranged to apply power to the wheel at one side of said machine, draft means connected at the opposite side of the machine to permit hitching of a draft animal, a control connection between the draft means and the power means arranged to initiate the application of mechanical power upon pulling by the draft animal and to release the same upon slacking of the pull by the animal, a block movably mounted on the frame adjacent to said control connection, and manually operable means to move said block to stop action of the control and to permit movement of the machine by the draft animal without actuation of the mechanical power means.

In testimony whereof I affix my signature in presence of two witnesses.

MARTIN L. HACKLEMAN.

Witnesses:
MURRAY L. MAGEE,
CHAS. T. WILLIAMS.